Sept. 6, 1960 — L. E. WOODFIELD — 2,951,306
FLOUNDER GIG
Filed March 9, 1959 — 2 Sheets-Sheet 1
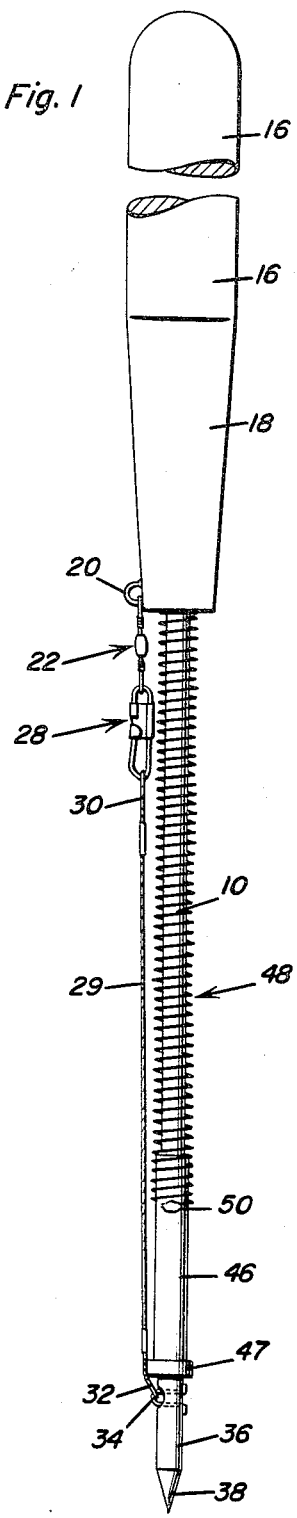
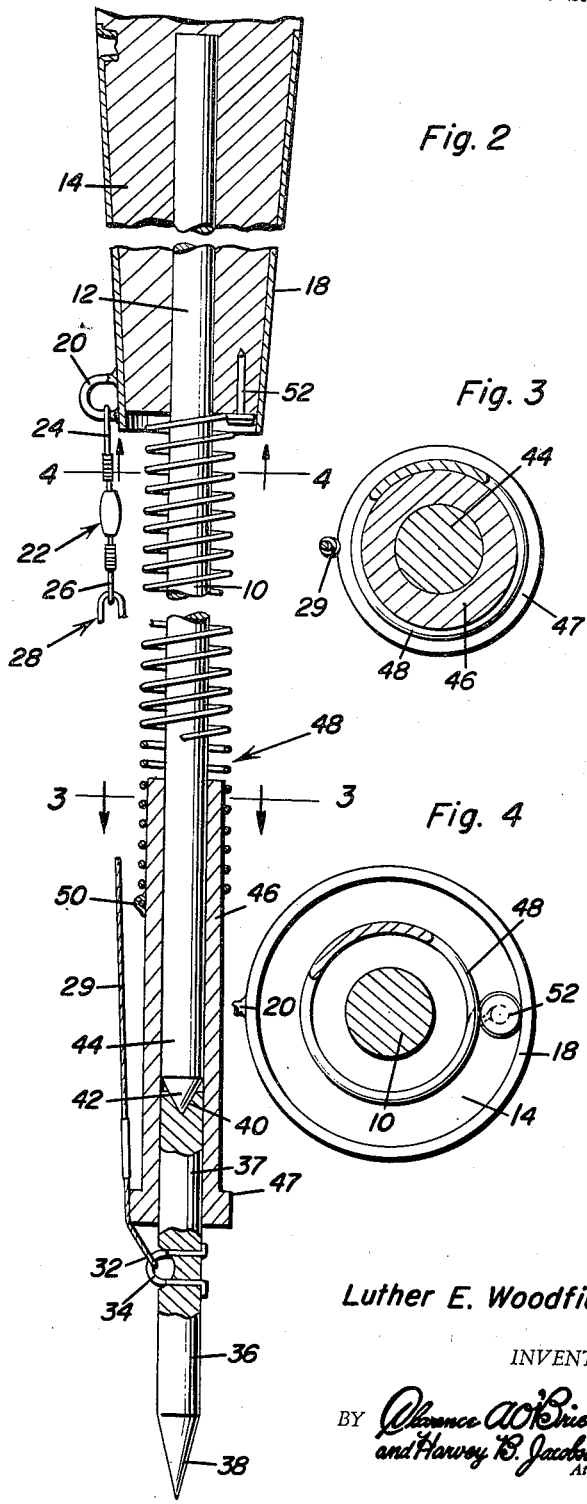
Luther E. Woodfield
INVENTOR.

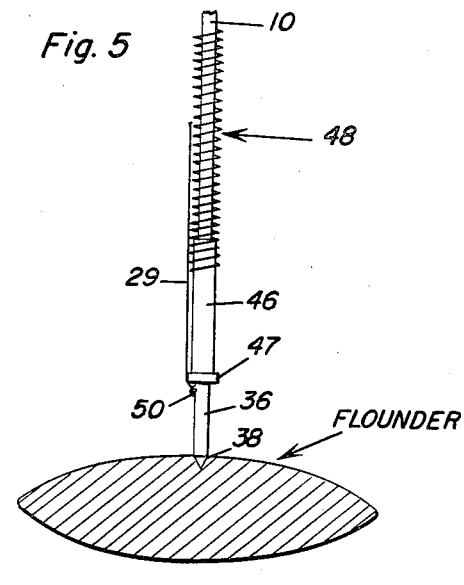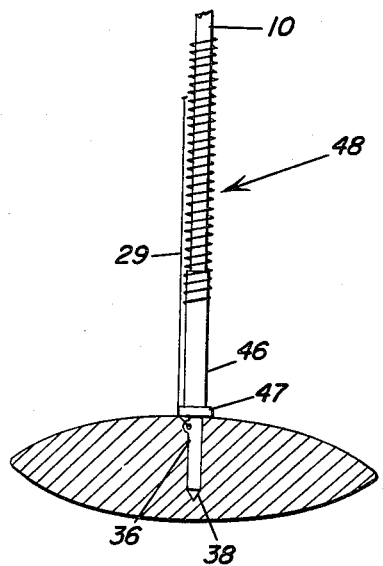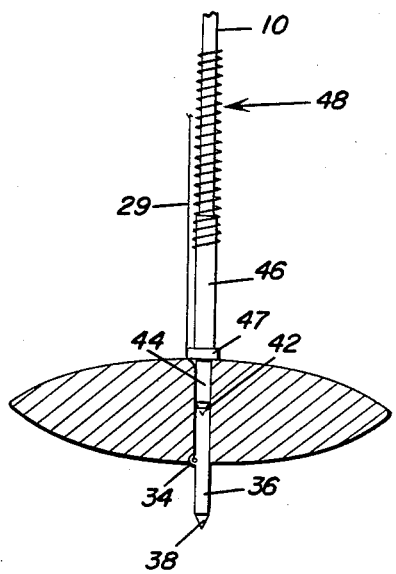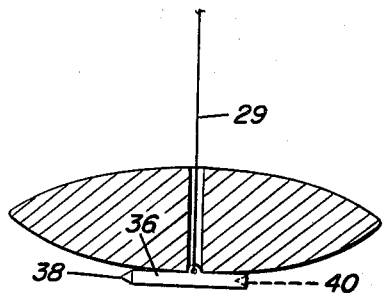
Luther E. Woodfield
INVENTOR.

United States Patent Office 2,951,306
Patented Sept. 6, 1960

2,951,306

FLOUNDER GIG

Luther E. Woodfield, E. Beach Drive,
Pass Christian, Miss.

Filed Mar. 9, 1959, Ser. No. 798,217

6 Claims. (Cl. 43—6)

This invention relates to an improved gig which is expressly, but not necessarily, designed and constructed for spearing and gigging fish, flounders for example.

In carrying out the concept, a distinctively novel gig has been perfected and reduced to practice. Of outstanding significance is the fact that a fisherman may use this improved gig not only to land and retrieve flounders more effectually, he does so with the confident assurance that the caught flounder will come to hand mutilated to a minimum degree. It follows that an object of the invention is to provide a gig which is implemented with cooperating expedients which, in a highly practical association and arrangement, perform to achieve the desired results better and more satisfactory than similarly constructed prior art fish spearing gigs.

Briefly summarized the improved gig embodies a suitably elongated shaft the length of which will vary from four feet when the user is walking to about ten feet which is suitable for "floundering" from a boat. The shaft is provided on the upper or rearward end with a suitable wooden or an equivalent handle. A spring biased sleeve is slidingly mounted on the forward end portion of the shaft. The spring is such that it serves to shove a forward portion of the sleeve beyond the forward end of the shaft to thus provide a socket in which an end portion of a penetrating and retrieving pin is telescopically and releasably mounted. The median portion of the penetrating pin is held captive by a restraining line, the upper end of the line being connected to the handle.

With further reference to the restraining line, the lower or forward end is permanently attached to a median portion of the pin and the forward end of the pin is pointed. The upper end of the line is connected to an openable and closable fastener which, in turn, is joined with the handle by way of a suitable swivel.

The invention also features a novel operating connection between the lower or forward end of the shaft and the adjacent upper end of the penetrating pin. That is to say, the pin is formed with a conical recess and the shaft with a conical terminal or point which is releasably fitted into the recess. This construction is desirable in that it facilitates the step of forcing or driving the pin through the flounder and allows the pin to take or assume a position at right angles to the line beneath the flounder for retrieving purposes. In other words, the unique coupling between the shaft and pin effects a quick acting and readily releasable connection which would not be achieved if the adjacent ends of the shaft and pin were otherwise brought into abutting relationship.

Other objects, features and advantages will become more readily apparent from the following description and the accompanying illustrative, but not restrictive, drawings.

In the drawings:

Fig. 1 is an elevational view of the complete ready-to-use flounder gig constructed in accordance with the principles of the invention.

Fig. 2 is an enlarged view with parts and sections and other parts in elevation and which shows all of the structural features which render the over-all implement practical and efficient in operation.

Fig. 3 and 4 are cross-sections on the lines 3—3 and 4—4, respectively, of Fig. 2.

Fig. 5 is a view on a smaller scale showing the pointed end of the penetrating pin about to be forcibly driven into the body of a flounder to make a catch.

Fig. 6 is a view based on Fig. 5 but showing the forward half portion of the pin piercing the flounder.

Fig. 7 is a view showing the relationship and cooperation of the aforementioned quick separable coupling or joint between the then protruding shaft and the about-to-be-released penetrating pin.

Fig. 8 is a view showing the penetrating pin its crosswise position completley separated from the gig and ready to make the desired retrieve.

Referring to the drawings and particularly to Figs. 1 to 4, inclusive, the rigid rod which provides the shank or shaft is denoted by the numeral 10 and, as already stated, it may be anywhere from four feet to ten feet, more or less, in length. The upper end portion 12 is fixedly secured in the lower tapering part 14 of the handle or hand grip 16. The tapered portion 14 is encased in an appropriate ferrule 18. On one side and at the bottom the ferrule is provided with an anchoring eye or clevis 20 to which a conventional swivel 22 has its upper end 24 permanently connected. The lower end of the swivel, that is the end portion 26, is connected with a safety-pin-type fastener 28. The flexible element, also called the leader or line and which is preferably of stainless steel, is denoted at 29. There is a loop 30 on the upper end which is detachably connected with the fastener 28. There is a similar loop 32 on the lower end which is attached to a U-shaped staple or equivalent anchoring member secured to the median or central portion of the rigid penetrating and retrieving pin 36. The forward or lower end of the pin is conical at 38 to provide a spearing point. The upper end of the pin has a conical recess or pocket 40 formed therein. This pocket serves to accommodate the pointed terminal 42 of the lower or forward end portion 44 of the aforementioned shaft. The pin and shaft are held in axially aligned coupled relationship by way of a sleeve 46 which is slidingly mounted on the end portion 44 of the shaft. If desired, the lower or forward end portion of the sleeve may be provided with a flange 47 which provides a satisfactory stop when it engages a flounder in the manner seen in Fig. 7. The aforementioned coil spring is denoted at 48. The lower end portion of the coil spring encircles the upper part of the sleeve and is securely anchored in place in any suitable manner as at 50. The upper end or coil of the spring abuts the bottom of the handle where it is nailed or appropriately secured at 52 to the handle.

It will be noticed that the length of the line 29 when it is stretched is such that it assists in holding the penetrating pin 36 in its set or coupled position within the socket portion of the sleeve 46. It is also to be mentioned that the tension of the coil spring 48 is such that it slides the sleeve 46 along the portion 44 of the shaft and causes the forward portion to project to define a socket in which the upper portion 37 of the pin 36 is fitted. Stated otherwise, the expansive action of the spring 48 forces the sleeve down and beyond the point 42 to define the socket and also to tauten line 27 so that the line and spring thus coordinate their respective functions properly. At the same time, the coil spring permits the implement to function as a springloaded plunger or, as it has sometimes been called, an automatic gig.

It will be evident that the gig is set for operation in the manner illustrated in Figs. 1 and 2. At this time the portion 37 of the pin 36 is telescoped into the socket and the separable joint or coupling is had by way of the recess 40 and the cooperating conical terminal or point 42. Thus, the portion 36 and its point 38 project sufficiently beyond the flange 47 to permit the gig to be landed against the flounder much in the manner somewhat diagrammatically shown in Fig. 5. As the implement is then forced through or into the body of the flounder, the flange 47 comes into contact with the body and begins to press the sleeve up against the tension of the coil spring. The sleeve continues to slide up as the force of the blow continues and, obviously, the pointed end of the plunger or shaft 44 enters the hole which is now formed in the flounder as brought out in Fig. 7. After the pin 36 has been forced all the way through the flounder and just before it assumes the right angular retrieving and retaining position (seen in Fig. 8), the features 40 and 42 effect an easy separation or breaking of the joint between the shaft and the pin. It has been found, after trial and error usage that if the abutting end-to-end portions of the pin and shaft are flat, the satisfactory coupling action seen in Fig. 7 was not maintained. Also, the uncoupling step is interfered with. Consequently, this break-joint coupling between the shaft and pin is regarded as a structural accomplishment of appreciable importance.

Once the pin takes the position seen in Fig. 8, the restraining line 29 becomes a captive line and the retrieving of the flounder can be accomplished in an obvious manner.

Minor changes in shape, size, materials and rearrangement of components or parts may be resorted to in actual practice without departing from the spirit of the invention or the scope of the invention as claimed.

What is claimed as new is as follows:

1. A flounder gig comprising an elongated shaft having a handle at its rearward end, said shaft, with the aid of said handle, being adapted to be forcibly plunged into a flounder, a sleeve slidingly mounted on the forward portion of said shaft, a coiled spring encircling said shaft with its upper end secured to said handle and its lower end encircling a portion of the sleeve and fixedly anchored on said sleeve, said spring being tensioned to press the forward end portion of the sleeve beyond the forward end of the shaft and providing a socket, a flounder penetrating pin having a portion thereof fitting telescopically and removably into said socket and a portion projecting beyond the sleeve and terminating in a tapered point, and a flexible element of prescribed length having one end attached to said handle and the other end secured to a median portion of said pin.

2. The structure defined in claim 1, and wherein said other end of the flexible element is permanently secured to said pin, said one end being detachably and swivelly attached to said handle.

3. A flounder gig comprising an elongated rigid shaft having a handle at its upper handling and thrust producing end, said shaft having a lower end which terminates in a tapering conical point, a coil spring encircling the shaft with an upper end secured to the handle and a lower end secured to a sleeve slidingly mounted on the lower portion of said shaft, said spring exerting pressure on the sleeve and pressing the lower end portion of the sleeve beyond the lower pointed end of the shaft to define a socket, a penetrating pin having an upper portion fitting releasably and slidingly in the socket, the upper end of the pin having an axial recess in which the conical end of the shaft is seated to provide a quick separable coupling between the shaft and pin, the lower end of the pin being pointed to assist in penetrating a flounder, and a restraining and retrieving line having the lower end fixedly joined to a median portion of said pin and the upper end connected with said handle.

4. A flounder gig comprising an elongated rigid shaft having a handle at its upper end, said shaft having a lower end having a tapering conical point, a coil spring encircling the shaft and having an upper end secured to said handle and a lower end secured to a sleeve slidingly mounted on the lower portion of said shaft, said spring exerting pressure on the sleeve and pressing and projecting the lower end portion of the sleeve beyond the lower pointed end of the shaft and defining a socket, a penetrating pin having an upper portion fitting releasably and slidingly in the socket, the upper end of the pin having an axial recess into which the conical end of the shaft is seated to provide a quick separable coupling between the shaft and pin, the lower end of the pin being pointed to assist in penetrating a flounder, and a restraining and retrieving line having the lower end fixedly jointed to a median portion of said pin and the upper end connected with said handle by way of a swivel which is directly mounted on the handle and a readily openable and closable fastener which is connected to said swivel, said line being connected to the fastener.

5. A flounder gig comprising an elongated shaft having a handle fixed for use, at the rearward end of the shaft, said shaft, with the aid of said handle, being adapted to be forcibly plunged into a flounder, a sleeve slidingly and removably mounted on the forward portion of said shaft, means affording an operating connection between the sleeve and handle, a flounder penetrating and retrieving member normally carried by said sleeve, and a flexible element attached to the handle and member respectively and holding the member captive after it has been freed from its set position in said sleeve, a predetermined leading end portion of said sleeve projecting beyond the forward end of the shaft and providing a socket, the adjacent cooperating rearward end portion of said penetrating member being releasably telescoped into said socket, and said operating connection comprising a coil spring encircling the shaft and an end portion of said sleeve, said spring being anchored at an upper end on said handle and at its lower end on said sleeve.

6. The structure defined in claim 5, and wherein said member comprises a rigid pin the leading end of which has a spearing point.

References Cited in the file of this patent

UNITED STATES PATENTS 2,236,437    Garrison _____ Mar. 25, 1941

FOREIGN PATENTS 881,691    France _____ May 5, 1943